United States Patent
Yasunori et al.

(10) Patent No.: US 12,030,441 B2
(45) Date of Patent: Jul. 9, 2024

(54) IN-VEHICLE RELAY APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Hiromichi Yasunori, Yokkaichi (JP); Makoto Chujo, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 132 days.

(21) Appl. No.: 17/757,851

(22) PCT Filed: Dec. 9, 2020

(86) PCT No.: PCT/JP2020/045836
§ 371 (c)(1),
(2) Date: Jun. 22, 2022

(87) PCT Pub. No.: WO2021/131699
PCT Pub. Date: Jul. 1, 2021

(65) Prior Publication Data
US 2023/0028076 A1   Jan. 26, 2023

(30) Foreign Application Priority Data
Dec. 24, 2019 (JP) .................. 2019-233527

(51) Int. Cl.
*B60R 16/02* (2006.01)
*B60R 16/023* (2006.01)
*B60R 16/03* (2006.01)

(52) U.S. Cl.
CPC ........ *B60R 16/0215* (2013.01); *B60R 16/023* (2013.01); *B60R 16/03* (2013.01)

(58) Field of Classification Search
None
See application file for complete search history.

(56) References Cited

U.S. PATENT DOCUMENTS

| | | | | | |
|---|---|---|---|---|---|
| 5,825,096 | A | * | 10/1998 | Morimoto | B60R 16/0215 296/214 |
| 6,273,499 | B1 | * | 8/2001 | Guyon | B60R 13/0212 174/72 A |

(Continued)

FOREIGN PATENT DOCUMENTS

| | | | | | |
|---|---|---|---|---|---|
| CN | 113169538 | A | * | 7/2021 | ......... B60R 16/0215 |
| EP | 1244191 | A2 | * | 9/2002 | ................ H02J 1/00 |

(Continued)

OTHER PUBLICATIONS

PCT_Chapter_2_IPR. 2021. WIPO (Year: 2021).*
International Search Report, Application No. PCT/JP2020/045836, mailed Feb. 9, 2021. ISA/Japan Patent Office.

*Primary Examiner* — Timothy J. Dole
*Assistant Examiner* — Muhammed Azam
(74) *Attorney, Agent, or Firm* — Honigman LLP

(57) ABSTRACT

An in-vehicle relay apparatus provided on a roof of a vehicle includes: a first connector connected to a power line and a communication line provided on one pillar of the vehicle; a second connector to which a power line and a communication line provided on a different pillar are connected; a branch line connector to which power lines and communication lines extending from a plurality of in-vehicle devices provided on the roof are connected; a branching portion branching a single wire system into power lines connected to the branch line connector, the single wire system being a system in which the power lines respectively connected to (Continued)

the first connector and the second connector are integrated into one system; and a relay unit relaying data passing between the communication lines connected to the first connector and the second connector and the communication lines connected to the branch line connector.

9 Claims, 7 Drawing Sheets

(56) References Cited

U.S. PATENT DOCUMENTS

| | | | | |
|---|---|---|---|---|
| 7,030,322 | B2 * | 4/2006 | Preissl | B60R 16/0215 |
| | | | | 174/138 R |
| 7,063,379 | B2 * | 6/2006 | Steuer | B60R 13/0212 |
| | | | | 296/223 |
| 7,306,276 | B2 * | 12/2007 | Berberich | B60R 7/04 |
| | | | | 296/193.04 |
| 10,053,031 | B2 * | 8/2018 | Shiratori | B60R 16/03 |
| 10,099,630 | B1 * | 10/2018 | Krishnan | G01S 7/4813 |
| 10,471,912 | B2 * | 11/2019 | Ishibashi | B60R 16/03 |
| 2004/0189092 | A1 * | 9/2004 | Burlak | H02J 1/14 |
| | | | | 307/10.1 |
| 2004/0223275 | A1 * | 11/2004 | Yanagida | H02J 13/00036 |
| | | | | 361/62 |
| 2005/0035656 | A1 * | 2/2005 | Kuramochi | H02J 7/1423 |
| | | | | 307/10.1 |
| 2017/0008464 | A1 * | 1/2017 | Kikuchi | H04L 69/08 |
| 2017/0201584 | A1 * | 7/2017 | Endo | B60R 16/023 |
| 2017/0225634 | A1 * | 8/2017 | Yasunori | H01R 13/70 |
| 2018/0019616 | A1 * | 1/2018 | Yasunori | B60R 16/03 |
| 2018/0043849 | A1 * | 2/2018 | Ishibashi | B60R 16/023 |
| 2018/0205414 | A1 * | 7/2018 | Tateishi | H04B 3/36 |
| 2018/0251084 | A1 * | 9/2018 | Tateishi | B60R 16/03 |
| 2018/0367335 | A1 * | 12/2018 | Mizutani | H04L 65/00 |
| 2018/0367546 | A1 * | 12/2018 | Miyashita | H04L 12/46 |
| 2018/0375199 | A1 * | 12/2018 | Papp | H04L 63/0254 |
| 2019/0084580 | A1 * | 3/2019 | Kodama | H04W 12/06 |
| 2019/0118744 | A1 * | 4/2019 | Takamatsu | B60R 16/0207 |
| 2019/0394277 | A1 * | 12/2019 | Go | H04L 69/08 |
| 2021/0103438 | A1 * | 4/2021 | Itatsu | G06F 13/00 |
| 2022/0006667 | A1 * | 1/2022 | Yasunori | B60R 16/02 |
| 2022/0416825 | A1 * | 12/2022 | Yasunori | H04L 12/46 |
| 2023/0028076 | A1 * | 1/2023 | Yasunori | H04W 84/12 |

FOREIGN PATENT DOCUMENTS

| | | | | |
|---|---|---|---|---|
| JP | H10-084629 | A | | 3/1998 |
| JP | 6121222 | B2 * | | 4/2017 |
| WO | WO-2017029966 | A1 * | 2/2017 | B60R 16/023 |
| WO | WO-2018008360 | A1 * | 1/2018 | B60R 16/033 |
| WO | WO-2018051607 | A1 * | 3/2018 | B60R 16/023 |
| WO | WO-2018088505 | A1 * | 5/2018 | B60R 16/02 |
| WO | WO-2018230132 | A1 * | 12/2018 | B60R 16/0207 |
| WO | WO-2020066790 | A1 * | 4/2020 | H04B 3/36 |
| WO | WO-2020122144 | A1 | 6/2020 | |
| WO | WO-2021111928 | A1 * | 6/2021 | B60R 16/023 |
| WO | WO-2021131603 | A1 * | 7/2021 | B60R 16/0215 |
| WO | WO-2021131699 | A1 * | 7/2021 | B60R 16/0215 |

* cited by examiner

IN-VEHICLE RELAY APPARATUS

CROSS-REFERENCE TO RELATED APPLICATIONS

This application is the U.S. national stage of PCT/JP2020/045836 filed on Dec. 9, 2020, which claims priority of Japanese Patent Application No. JP 2019-233527 filed on Dec. 24, 2019, the contents of which are incorporated herein.

TECHNICAL FIELD

The present disclosure relates to an in-vehicle relay apparatus.

BACKGROUND

Various in-vehicle devices such as power supply apparatuses and communication apparatuses are installed in a vehicle. Wire harnesses that include communication lines for communication between in-vehicle devices and power lines for supplying power to the in-vehicle devices is provided in a vehicle. At least one wire harness provided in a vehicle is routed along a pillar and connected to a ceiling-side control apparatus disposed on the ceiling of the vehicle (see JP 2018-24395A, for example).

No consideration is given to redundancy between the ceiling-side control apparatus disclosed in JP 2018-24395A and another apparatus connected thereto via a wire harness routed along a pillar.

The present disclosure has been made in light of the above circumstances, and provides an in-vehicle relay apparatus that is provided on a vehicle roof and with which redundancy can be imparted to connection with an in-vehicle apparatus that is not provided on the roof.

SUMMARY

An in-vehicle relay apparatus according to an aspect of the present disclosure is an in-vehicle relay apparatus to be provided on a roof of a vehicle, including: a first connector to which a power line and a communication line provided on one pillar of the vehicle are to be connected; a second connector to which a power line and a communication line provided on a different pillar from the one pillar are to be connected; a branch line connector to which power lines and communication lines extending from a plurality of in-vehicle devices provided on the roof are to be connected; a branching portion that branches a single wire system into power lines that are connected to the branch line connector, the single wire system being a system in which the power lines respectively connected to the first connector and the second connector are integrated into one system; and a relay unit configured to relay data passing between the communication lines respectively connected to the first connector and the second connector and the communication lines connected to the branch line connector.

Advantageous Effects of Present Disclosure

According to an aspect of the present disclosure, it is possible to provide an in-vehicle relay apparatus that is provided on a vehicle roof and with which redundancy can be imparted to connection with an in-vehicle apparatus that is not provided on the roof.

DETAILED DESCRIPTION OF PREFERRED EMBODIMENTS

Figure 1:
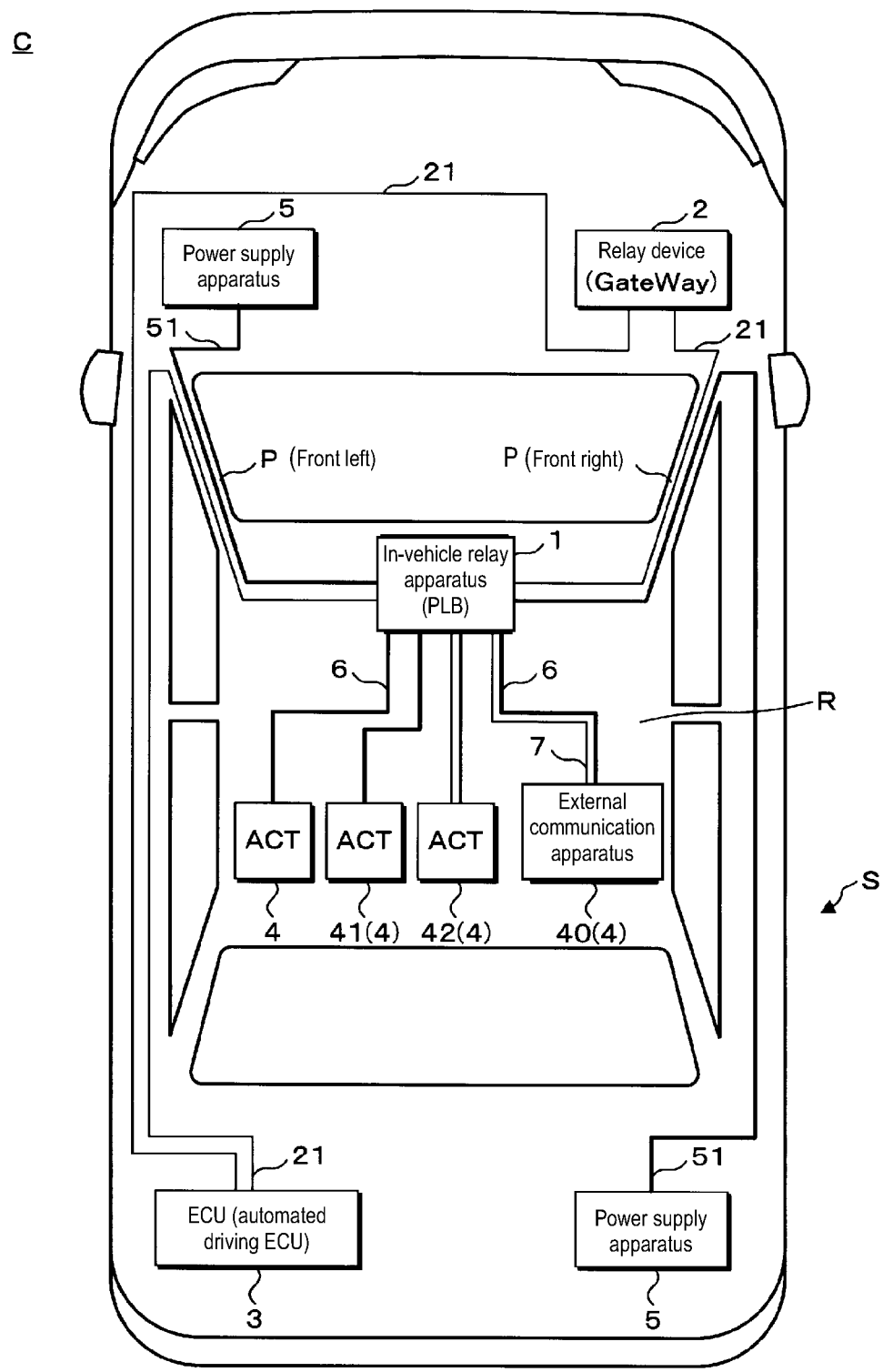
FIG. 1 is a schematic plan view of a configuration of a vehicle in which an in-vehicle relay apparatus according to Embodiment 1 (left and right pillars) is installed.

First, embodiments of the present disclosure will be listed and described below. Furthermore, the embodiments described below may at least be partially combined as appropriate.

First Aspect

An in-vehicle relay apparatus according to a first aspect of the present disclosure is an in-vehicle relay apparatus to be provided on a roof of a vehicle, including: a first connector to which a power line and a communication line provided on one pillar of the vehicle are to be connected; a second connector to which a power line and a communication line provided on a different pillar from the one pillar are to be connected; a branch line connector to which power lines and communication lines extending from a plurality of in-vehicle devices provided on the roof are to be connected; a branching portion that branches a single wire system into power lines that are connected to the branch line connector, the single wire system being a system in which the power lines respectively connected to the first connector and the second connector are integrated into one system; and a relay unit configured to relay data passing between the communication lines respectively connected to the first connector and the second connector and the communication lines connected to the branch line connector.

In the first aspect, the in-vehicle relay apparatus provided on the roof of the vehicle includes the first connector and the second connector, and power lines and communication lines connected to the first connector and the second connector are provided on different pillars. The in-vehicle relay apparatus is connected to the in-vehicle apparatus not provided on the roof by the power lines and communication lines routed along different pillars. Accordingly, even if one of the power lines and communication lines of the power lines and communication lines provided on different pillars is disconnected, the relaying of power and data passing through the communication lines to the in-vehicle device connected to the branch line connector can be continued via the power line and the communication line provided on the other pillar. That is, redundancy can be ensured in the relaying of power and data between the in-vehicle device provided on the roof and the power supply apparatus and other in-vehicle apparatuses such as a relay device not provided on the roof, via the in-vehicle relay apparatus.

Second Aspect

The in-vehicle relay apparatus according to a second aspect of the present disclosure, wherein rectifying elements are respectively provided interposed between the first and second connectors and the single wire system, with a direction from the first connector and the second connector toward the single wire system being a forward direction.

In the second aspect, rectifying elements, which are diodes or the like, are interposed between the first and second connectors and the single wire system, for example, and the rectifying elements are provided with the direction from the first connector and the second connector toward the single wire system (the cathodes of the diodes are on the single wire system side) being the forward direction. Accordingly, even if a difference occurs in the voltages applied to the power lines respectively connected to the first connector and the second connector, reverse flow of current can be suppressed.

Third Aspect

An in-vehicle relay apparatus according to a third aspect of the present disclosure, wherein relay elements are respectively provided interposed between the first and second connectors and the single wire system.

In the third aspect, relay elements are respectively provided between the first and second connectors and the single wire system, and thus power supplied via the power lines connected to the first connector and the second connector can be supplied and interrupted by opening and closing the relay elements.

Fourth Aspect

The in-vehicle relay apparatus according to a fourth aspect of the present disclosure, including: a detection unit configured to detect a voltage applied via the power lines connected to the first connector and the second connector; and an open/close control unit configured to control opening and closing of the relay elements based on a detection value output from the detection unit.

In the fourth aspect, the open/close control unit controls opening and closing of the relay elements based on detection values output from the detection unit that detects the voltages applied via the power lines connected to the first connector and the second connector, and thus opening and closing of the relay elements can be efficiently performed according to each of the applied voltages.

Fifth Aspect

The in-vehicle relay apparatus according to a fifth aspect of the present disclosure, wherein the detection value includes information regarding a voltage value of each of the voltage applied via the power line connected to the first connector and the voltage applied via the power line connected to the second connector, if one of the voltage values is lower than a predetermined threshold, the open/close control unit performs control to open the relay element connected to the power line to which the voltage of the one voltage value is applied, and if one of the voltage values is greater than or equal to the predetermined threshold, the open/close control unit performs control to close the relay element connected to the power line to which the voltage of the one voltage value is applied.

In the fifth aspect, if one of the voltage values of the voltages applied via the power lines connected to the first connector and the second connector is smaller than a predetermined threshold, the open/close control unit opens (turns off) the relay element on the side to which the voltage that is smaller than the predetermined threshold is applied, and, if the voltage is greater than or equal to the predetermined threshold, closes (turns on) the relay element. Accordingly, whether or not the voltages applied via the power lines connected to the first connector and the second connector are normal can be determined based on the threshold, and the relay elements can be opened or closed.

Sixth Aspect

The in-vehicle relay apparatus according to a sixth aspect of the present disclosure, wherein two power supply apparatuses are installed in the vehicle, and the power supply apparatus to which a voltage is applied via the power line connected to the first connector, and the power supply apparatus to which a voltage is applied via the power line connected to the second connector are different from each other.

In the sixth aspect, the power supply apparatus that applies a voltage via the power line connected to the first connector and the power supply apparatus that applies a voltage via the power line connected to the second connector are different power supply apparatuses, and thus, for example, even if one of the power lines is disconnected, power supplied via the other power line can be distributed and supplied to an in-vehicle device connected to the branch line connector.

Seventh Aspect

The in-vehicle relay apparatus according to a seventh aspect of the present disclosure, wherein the one pillar and the pillar different from the one pillar are pillars respectively located on the left and right sides of the vehicle.

In the seventh aspect, one pillar and a pillar different from the one pillar, that is, the pillar provided with the power line and the communication line connected to the first connector and the pillar provided with the power line and the communication line connected to the second connector are pillars located on the left and right sides of the vehicle. Accordingly, for example, even if the vehicle is subjected to a side-on collision from either the left or right side, the in-vehicle relay apparatus can continue to relay power and data between an in-vehicle device provided on the roof and an in-vehicle device not provided on the roof via the power line and the communication line provided on the pillar not on the side subjected to the collision.

Eighth Aspect

The in-vehicle relay apparatus according to an eighth aspect of the present disclosure, wherein the one pillar and the pillar different from the one pillar are pillars respectively located on the front and rear sides of the vehicle.

In the eighth aspect, one pillar and a pillar different from the one pillar, that is, the pillar provided with the power line and the communication line connected to the first connector and the pillar provided with the power line and the communication line connected to the second connector are pillars located on the front and rear sides of the vehicle. Accordingly, even if the vehicle is subjected to a collision from the front or rear, for example, an in-vehicle relay apparatus can continue to relay power and data between the in-vehicle device provided on the roof and an in-vehicle device not provided on the roof, via the power line and the communication line provided on the pillar on the side not subjected to the collision.

Ninth Aspect

The in-vehicle relay apparatus according to a ninth aspect of the present disclosure, wherein the relay unit includes an Ether switch, and an Ethernet PHY unit is interposed between the first and second connectors and the Ether switch.

In the ninth aspect, the relay unit includes an Ether switch, and thus the in-vehicle relay apparatus functions as, for example, an Ether switch such as a layer 2 switch or a layer 3 switch for IP packets passing through the communication lines. Accordingly, further redundancy can be achieved in relaying of IP packets between an in-vehicle device provided on the roof and an in-vehicle device not provided on the roof.

Tenth Aspect

The in-vehicle relay apparatus according to a tenth aspect of the present disclosure, wherein the relay unit includes a CAN gateway, and a CAN transceiver is interposed between the first and second connectors and the CAN gateway.

In the tenth aspect, the relay unit includes a CAN gateway, and thus the in-vehicle relay apparatus functions as a CAN controller and a CAN gateway for CAN messages that pass through the communication lines. Accordingly, further redundancy can be achieved in the relaying of CAN messages between an in-vehicle device provided on the roof and an in-vehicle device not provided on a roof.

The present disclosure will be described in detail based on drawings showing embodiments thereof. An in-vehicle relay system S according to embodiments of the present disclosure will be described below with reference to the drawings. Note that the present disclosure is not limited to these illustrative examples, but is indicated by the claims, and all changes that come within the meaning and range of equivalency of the claims are intended to be embraced therein.

Embodiment 1

Figure 2:
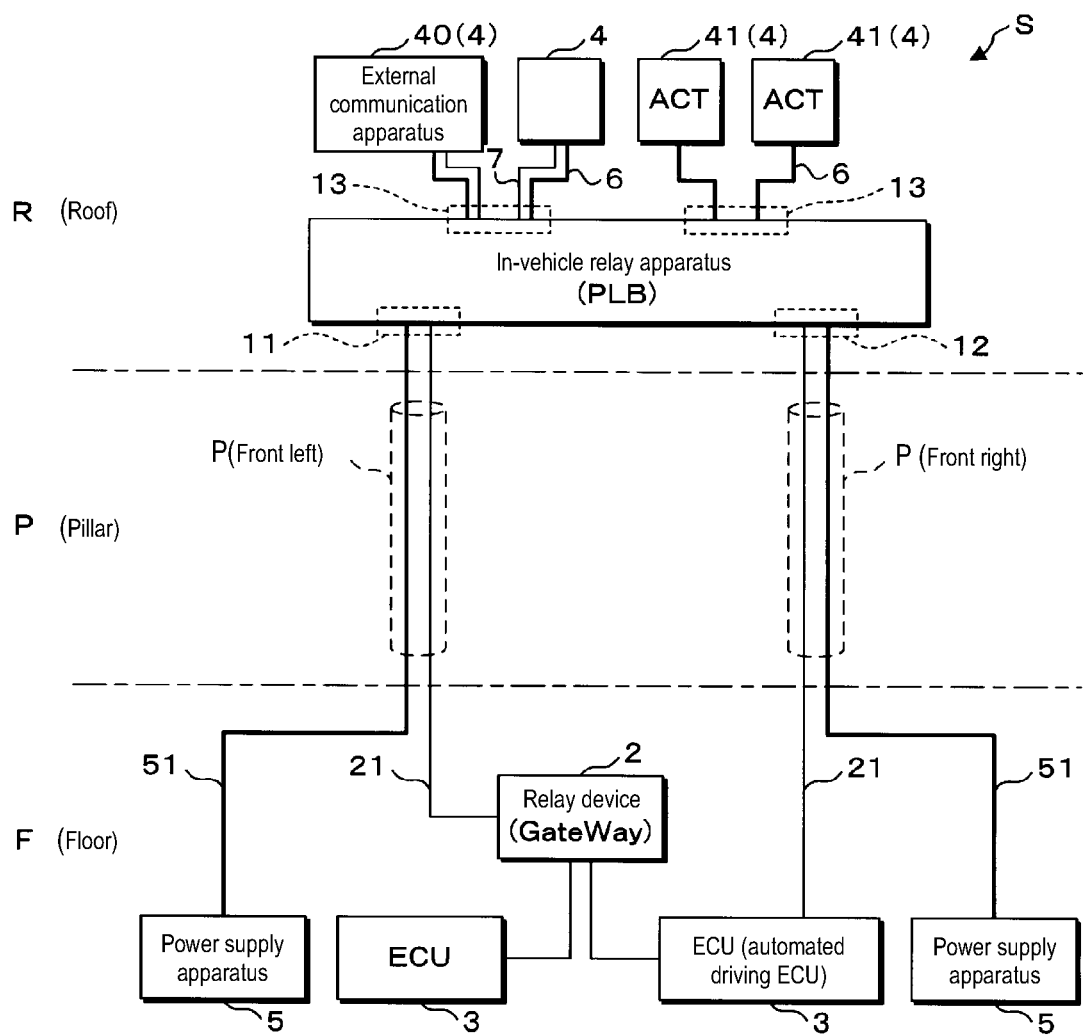
FIG. 2 is a block diagram showing a configuration of an in-vehicle relay system.

FIG. 1 is a schematic plan view showing a configuration of a vehicle C in which an in-vehicle relay apparatus 1 according to Embodiment 1 (left and right pillar) is installed. FIG. 2 is a block diagram showing a configuration of the in-vehicle relay system S. The in-vehicle relay system S is installed in the vehicle C, and includes the in-vehicle relay apparatus 1 that is provided on the roof R of the vehicle C, a plurality of in-vehicle apparatuses such as a relay device 2 and an in-vehicle ECU 3 (automated driving ECU) that are connected to the in-vehicle relay apparatus 1 by a plurality of communication paths via communication lines 21 provided on different pillars P, and a plurality of power supply apparatuses 5 that are connected to the in-vehicle relay apparatus 1 via power lines 51 provided on different pillars P.

The in-vehicle relay apparatus 1 provided on the roof (ceiling) R of the vehicle C, a plurality of in-vehicle devices 4, and in-vehicle apparatuses such as another relay device 2 (central G/W), the in-vehicle ECU 3 (automated driving ECU), and the power supply apparatuses 5 not provided on the roof are installed in the vehicle C. The in-vehicle relay apparatus 1 is connected to the relay device 2 (central G/W), the in-vehicle ECU 3 (automated driving ECU), and the two power supply apparatuses 5 not provided on the roof R, via the power lines 51 and the communication lines 21 respectively provided on left and right pillars P.

The relay device 2 directly connected to the in-vehicle relay apparatus 1 is, for example, a relay apparatus such as a central gate way (G/W), and is equipped with the function of an Ether switch or a CAN gateway. Also, the relay device 2 may be configured as a functional component of a body ECU that controls the entire vehicle C.

The in-vehicle ECU 3 directly connected to the in-vehicle relay apparatus 1 is, for example, an automated driving ECU that performs processing related to recognition or determination for carrying out automated driving, and is equipped with the function of an Ether switch or the like as is the relay device 2.

The power supply apparatuses 5 are batteries of the vehicle C, are constituted by a secondary cell such as a lead power storage battery or a lithium ion battery, and supply power by applying, for example, a voltage of 12 V to the in-vehicle relay apparatus 1 via the corresponding power lines 51 respectively routed along the pillars P.

Wire harnesses each constituted by a power line 51 and a communication line 21 are routed between the roof R and a floor F or the like, along left and right pillars P In the illustration shown in FIG. 1, the in-vehicle relay apparatus 1 is connected to the power supply apparatus 5 located on the front left side of the vehicle C by the power line 51 routed along the front left pillar P, and connected to the in-vehicle ECU 3 (automated driving ECU) located on the rear left side of the vehicle C by the communication line 21 routed along the front left pillar P. Furthermore, the in-vehicle relay apparatus 1 is connected to the power supply apparatus 5 located on the right side of the rear portion of the vehicle C by the power line 51 routed along the front-right pillar P, and is connected to the relay device 2 located on the right side of the front portion of the vehicle C by the communication line 21 routed along the front-right pillar P.

In the in-vehicle relay apparatus 1, power is output and supplied by the power supply apparatuses 5 using two systems realized by the power lines 51 connected to each of the different power supply apparatuses 5 and routed on different pillars P Accordingly, the in-vehicle relay apparatus 1 is supplied with power from two different systems, and a redundant power supply configuration is formed by the in-vehicle relay apparatus 1 and the two power supply apparatuses 5.

The in-vehicle relay apparatus 1 is directly connected to the relay apparatus 2 and the in-vehicle ECU 3 (automated driving ECU) by the communication lines 21 routed on different pillars P, respectively. Two communications lines 21 are connected to each of the relay apparatus 2 and the in-vehicle ECU 3 (automated driving ECU), one of the two communication lines 21 being connected to the in-vehicle relay apparatus 1 via a pillar P as described above, and the other communication line 21 connecting the relay apparatus 2 and the in-vehicle ECU 3 (automated driving ECU).

While described in detail later, the relay device 2 and the in-vehicle ECU 3 (automated driving ECU) are in-vehicle apparatuses that, similar to the in-vehicle relay apparatus 1, are equipped with the function of a relay apparatus such as an Ether switch or a CAN gateway, and other in-vehicle ECUs 3 are also connected to the relay device 2 and the in-vehicle ECU 3 (automated driving ECU) (see FIG. 6). Thus, the in-vehicle relay apparatus 1 and the relay device 2 and the in-vehicle ECU 3 (automated driving ECU) that are communicably connected to each other by the communication lines 21 routed on different pillars P form an in-vehicle LAN 30 which has a loop-shaped network topology.

The in-vehicle relay apparatus 1 is communicably connected to the relay apparatus 2 and the in-vehicle ECU 3 (automated driving ECU) over two different paths. Accordingly, the in-vehicle relay apparatus 1, the relay device 2, and the in-vehicle ECU 3 (automated driving ECU) form a redundant communication configuration between the in-vehicle devices 4 provided on the roof R and in-vehicle apparatuses that are not provided on the roof R such as the in-vehicle ECUs 3.

The in-vehicle devices 4 provided on the roof R are each connected to the in-vehicle relay apparatus 1 by an in-roof wire 6, an in-roof communication line 7, or a wire harness including both the in-roof wire 6 and the in-roof communication line 7. Power and data (communication data) are relayed to the in-vehicle devices 4 by the in-vehicle relay apparatus 1.

The in-vehicle devices 4 provided on the roof R include, for example, wireless apparatuses such as an intra-vehicle communication apparatus, a road-vehicle communication apparatus, or an external communication apparatus 40, a display apparatus, an image capturing apparatus, a sensor apparatus such as an infrared sensor or a Lidar sensor, and an in-vehicle load 41 (actuator) which is a map lamp, a roof R opening/closing apparatus, or the like.

The wireless apparatuses may include an analog communication apparatus that performs analog communication and a digital communication apparatus that performs digital communication employing a mobile communication protocol such as Wi-Fi, LTE (Long Term Evolution/registered trademark), 4G, or 5G. The external communication apparatus 40 may use these protocols to be communicably connected to a server outside the vehicle such as a cloud server via an external network such as the Internet.

The image capturing apparatus may include an in-vehicle camera, a driver monitoring camera, and a stereo camera for measuring the distance to an object outside the vehicle. The in-vehicle devices 4 provided on the roof R may include a GPS, a radio receiver, and a television receiver. An in-vehicle device 4 provided on the roof R may be an in-vehicle ECU 3 for controlling an actuator or the like that pivots the imaging direction of a camera provided on the outer surface of the roof R.

The in-vehicle relay apparatus 1 distributes and supplies power supplied from the two power supply apparatuses 5 to the in-vehicle devices 4 provided on the roof R via the in-roof wires 6. The in-vehicle relay apparatus 1 relays, via the in-roof communication lines 7, data transmitted from the relay device 2 or the in-vehicle ECU 3 (automated driving ECU) to the in-vehicle devices 4 provided on the roof R. The in-vehicle relay apparatus 1 relays, via the in-roof communication lines 7, data transmitted from the in-vehicle devices 4 provided on the roof R to the relay device 2 or the in-vehicle ECU 3 (automated driving ECU). The in-vehicle relay apparatus 1 configured in this manner is referred to as a PLB (Power Lan Box) or an ACU (Area Control Unit) that functions both as a power distribution box and a gateway or the like.

The in-vehicle relay apparatus 1 has, for example, a rectangular casing, and a first connector 11 and a second connector 12 are provided on one face of the casing. The power line 51 and the communication line 21 routed along one pillar P are connected to the first connector 11, and the power line 51 and the communication line 21 routed along the other pillar P are connected to the second connector 12.

More than one (two in the drawings) branch line connectors 13 are provided on one face of the casing of the in-vehicle relay apparatus 1. The face on which the branch line connectors 13 are provided may be the same as the face provided with the first connector 11 and the second connector 12 or a different face. The branch line connectors 13 are each connected to in-vehicle devices provided on the roof R by the in-roof wires 6, the in-roof communication lines 7, or both the in-roof wires 6 and the in-roof communication lines 7.

A power storage apparatus or an in-vehicle apparatus such as the relay device 2 not provided on the roof R, and the in-vehicle communication apparatus 40 and the in-vehicle devices 4, which are sensors or the like, provided on the roof R are connected to each other via the in-vehicle relay apparatus 1. Accordingly, there is no need to directly connect the in-vehicle devices 4 provided on the roof R and an in-vehicle device such as a power storage apparatus or the relay device 2 not provided on the roof R, and thus it is possible to suppress an increase in the number of power lines 51 and communication lines 21 routed on the pillars P that form paths for linking the roof R and places other than the roof R such as the floor. Furthermore, by respectively connecting the power lines 51 and the communication lines 21 routed on different pillars P via the first connector 11 and the second connector 12, a redundant configuration can be formed.

In the present embodiment, the pillars P on which the power lines 51 and the communication lines 21 are routed are left and right pillars P of the vehicle C. Thus, even in a case where the vehicle C is subjected to a side-on collision from either the left or right side thus disconnecting the power line 51 and the communication line 21 routed on the pillar P on either the left or right side, the supply of power and the relaying of communication data to in-vehicle devices provided on the roof R can be continued by the power line 51 and the communication line 21 on the other pillar P.

Figure 3:
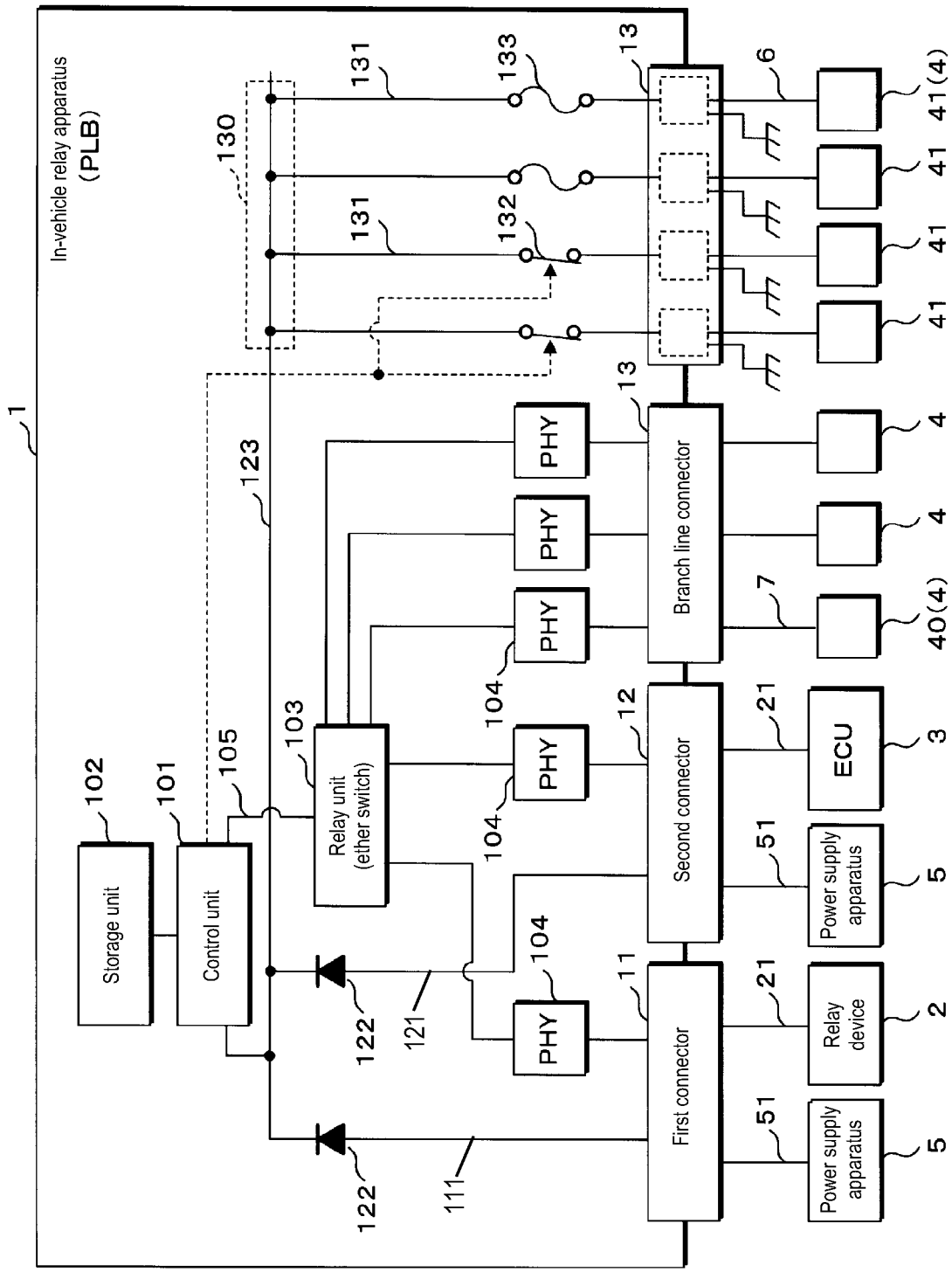
FIG. 3 is a block diagram showing a configuration of the in-vehicle relay apparatus.

FIG. 3 is a block diagram showing a configuration of the in-vehicle relay apparatus 1. The in-vehicle relay apparatus 1 includes a control unit 101, a storage unit 102, and a relay unit 103. The control unit 101 is communicably connected to the storage unit 102 and the relay unit 103 by an internal bus 105. The in-vehicle relay apparatus 1 includes, as a communication system that conforms to Ethernet (registered trademark) for example, a plurality of Ethernet PHY units 104 that are connected to the relay unit 103 via the internal bus 105. The in-vehicle relay apparatus 1 includes, as a power supply system, a first wire 111 that is connected to a power line 51 via the first connector 11, a second wire 121 that is connected to a power line 51 via the second connector 12, a single wire system 123 in which the first wire 111 and the second wire 121 are integrated into a single system, and a branching portion 130 that branches the single wire system 123 into branching wires 131.

The control unit 101 is constituted by a CPU (Central Processing Unit), an MPU (Micro Processing Unit), or the like, and is configured to read out and execute a control program and data stored in advance in the storage unit 102 to perform various types of control processing and computation processing, etc. The control unit 101 may function as a layer 3 switch and perform control regarding relaying by executing control programs and the like. Also, the control unit 101 may be constituted by an FPGA (Field Programmable Gate Array) or an IC chip realized by an ASIC (Application Specific Integrated Circuit) or the like, and perform control regarding relaying based on the circuit configuration (relay circuit) of the FPGA or the like. Also, the control unit 101 and the storage unit 102 may be constituted by a microcomputer in which these units are an integrated package. The control unit 101 may perform conversion processing (protocol conversion) between differing protocols such as those of Ethernet and CAN.

The storage unit 102 is constituted by a volatile memory element such as a RAM (Random Access Memory), or a non-volatile memory element such as a ROM (Read Only Memory), an EEPROM (Electrically Erasable Programmable ROM) or a flash memory, and control programs and data that are referred to during processing are stored in advance therein. A control program stored in the storage unit 102 may be a control program that has been read from a recording medium (not shown) that can be read by the control unit 101. Also, the control program may be a control program downloaded from an external computer (not shown) connected to a communication network (not shown) and stored in the storage unit 102. Furthermore, when relay control is performed, the storage unit 102 stores information regarding path information (a routing table) that has been defined based on communication protocol.

The relay unit 103 is a computation circuit constituted by, for example, an FPGA or an ASIC, and is a layer 2 switch that performs relay processing on IP packets received via the Ethernet PHY units 104. Also, the relay unit 103 includes a CPU as is the case with the control unit 101, and executes a relay control program, and may function as a layer 2 switch or a layer 3 switch.

The Ethernet PHY units 104 include an Ethernet PHY unit 104 (PHY) on the first connector 11 and the second connector 12 side, and an Ethernet PHY unit 104 on the branch line connector 13 side. These Ethernet PHY units 104 correspond to communication units of the in-vehicle relay apparatus 1. The Ethernet PHY units 104 are physical layer interfaces (I/F) that are determined based on Ethernet communication protocol.

The Ethernet PHY units 104 on the first connector 11 and the second connector 12 side are connected to the communication lines 21 (Ethernet cable) connected to the first connector 11 and the second connector 12, that is, connected to the communication line 21 (Ethernet cable) connected to the relay device 2 or the in-vehicle ECU 3 (automated driving ECU), which are not provided on the roof R. The Ethernet PHY units 104 on the branch line connector 13 side are connected to the in-roof communication lines 7 (Ethernet cable) connected to the branch line connector 13, that is, connected to the in-roof communication lines 7 (Ethernet cable) connected to in-vehicle devices 4 such as the external communication apparatus 40 provided on the roof R.

The relay unit 103 that functions as an Ether switch and the Ethernet PHY units 104 are connected in a star shaped-topology by the internal bus 105, and the relay unit 103 refers to MAC addresses included in IP packets received via the Ethernet PHY units 104 to perform relay control such as switching. The relay unit 103 detects whether or not the communication lines 21 are broken by obtaining the carrier sense of the communication lines 21 connected thereto via the Ethernet PHY units 104, for example. Further communication redundancy can be realized by the relay unit 103 disabling the Ethernet PHY unit 104 connected to the communication line 21 that cannot communicate due to disconnection or the like thereof, and using another Ethernet PHY unit 104, that is, only using an Ethernet PHY unit 104 connected to a properly functioning communication line 21.

In the power supply system of the in-vehicle relay apparatus 1, a dual system parallel circuit is formed by the first wire 111 and the second wire 121. In the case of the present embodiment, the voltage from the power storage apparatus connected via the first connector 11 is applied to the first wire 111, and the voltage from the power storage apparatus connected via the second connector 12 is applied to the second wire 121.

A rectifying element 122, which is a diode or the like, is provided on each of the first wire 111 and the second wire 121. A rectifying element 122 is provided on the first wire 111 between the first connector 11 and the single wire system 123, and a rectifying element 122 is provided on the second wire 121 between the second connector 12 and the single wire system 123.

The cathodes of the rectifying elements 122, which are diodes, are located on the single wire system 123 side and the anodes thereof are located on the first connector 11 and the second connector 12 side, the rectifying elements 122 respectively being provided on the first wire 111 and the second wire 121. That is, the rectifying elements 122, which are diodes, are provided interposed between the first connector 11 and the second connector 12 and the single wire system 123, with a direction from the first connector 11 and the second connector 12 toward the single wire system 123 being a forward direction. Accordingly, even if a difference (potential difference) occurs between the voltage of the power supply apparatus 5 connected to the first connector 11 (first wire 111) and the voltage of the power supply apparatus 5 connected to the second connector 12 (second wire 121), reverse flow of current toward the power supply apparatus 5 with the lower voltage can be prevented.

The single wire system 123 is formed by integrating the first wire 111 and the second wire 121 into a single system. The single wire system 123 may be formed by a bus bar, a lead wire, or a land on a circuit board, for example. The control unit 101 is supplied with power via wires branched from the single wire system 123.

The single wire system 123 is branched into branching wires 131 by the branching portion 130. A parallel circuit is formed by the branching wires 131 branched by the branching portion 130. Each of the branching wires 131 is connected to a branch line connector 13, and connected to a power terminal included in the branch line connector 13. A pair of power terminals to which the branching wires 131 are connected may be provided with a ground terminal.

Each of the branching wires 131 is provided with a fuse 133 or a load relay 132 according to the in-vehicle device 4, such as the in-vehicle load 41, connected via the branch line connector 13. The fuse 133 may be a semiconductor fuse 133 that employs a FET or the like. The load relay 132 may be a mechanical relay or a semiconductor relay that employs a FET or the like.

The in-vehicle devices 4 connected, via the branch line connector 13, to the branching wires 131 provided with the load relay 132 are in-vehicle loads 41 that are a map light or a room light, and these lights are turned on or off according to opening/closing (on/off) of the corresponding load relay 132. The control unit 101 and these load relays 132 are connected by a signal line. A configuration is possible in which, based on communication data received from an in-vehicle apparatus such as the in-vehicle ECU 3 (body ECU) not provided on the roof R, via the relay unit 103, the control unit 101 may control the driving of the actuators of the in-vehicle loads 41 or the like connected to the load relays 132 by turning the corresponding load relays 132 on or off.

With the present embodiment, even if one of the power lines 51 and the communication lines 21 provided on different pillars P are broken, the relaying of power and data passing through the communication line 21 to the in-vehicle devices 4 connected to the branch line connectors 13 can be continued via the power line 51 and the communication line 21 provided on the other pillar P Accordingly, redundancy can be ensured in the relaying of power and data between the in-vehicle devices 4 provided on the roof R and the in-vehicle apparatuses not provided on the roof R.

With the present embodiment, the rectifying elements 122, which are diodes or the like, are interposed between the first connector 11 (first wire 111) and the second connector 12 (second wire 121) and the single wire system 123. Accordingly, even if a power system for supplying power to the in-vehicle relay apparatus 1 is duplicated, and a potential difference occurs between the duplicated power systems, a current is prevented from flowing in reverse through the first wire 111 or the second wire 121.

In the present embodiment, each pillar P is described as having a power line 51 and a communication line 21 routed thereon, but the present disclosure is not limited to this, and a cable in which the power line 51 and the communication line 21 are integrated using PoE (Power of Ethernet/Power over Ethernet) or PLC (Power Line Communication) may be employed, for example. In this case, a configuration may be employed where the first connector 11 and the second connector 12 include, for example, a filter circuit for separating a current (a power current) and communication data, and the separated currents are allowed to flow to the first wire 111 and the second wire 121 and the communication data is output to each of the Ethernet PHY units 104.

Figure 4:
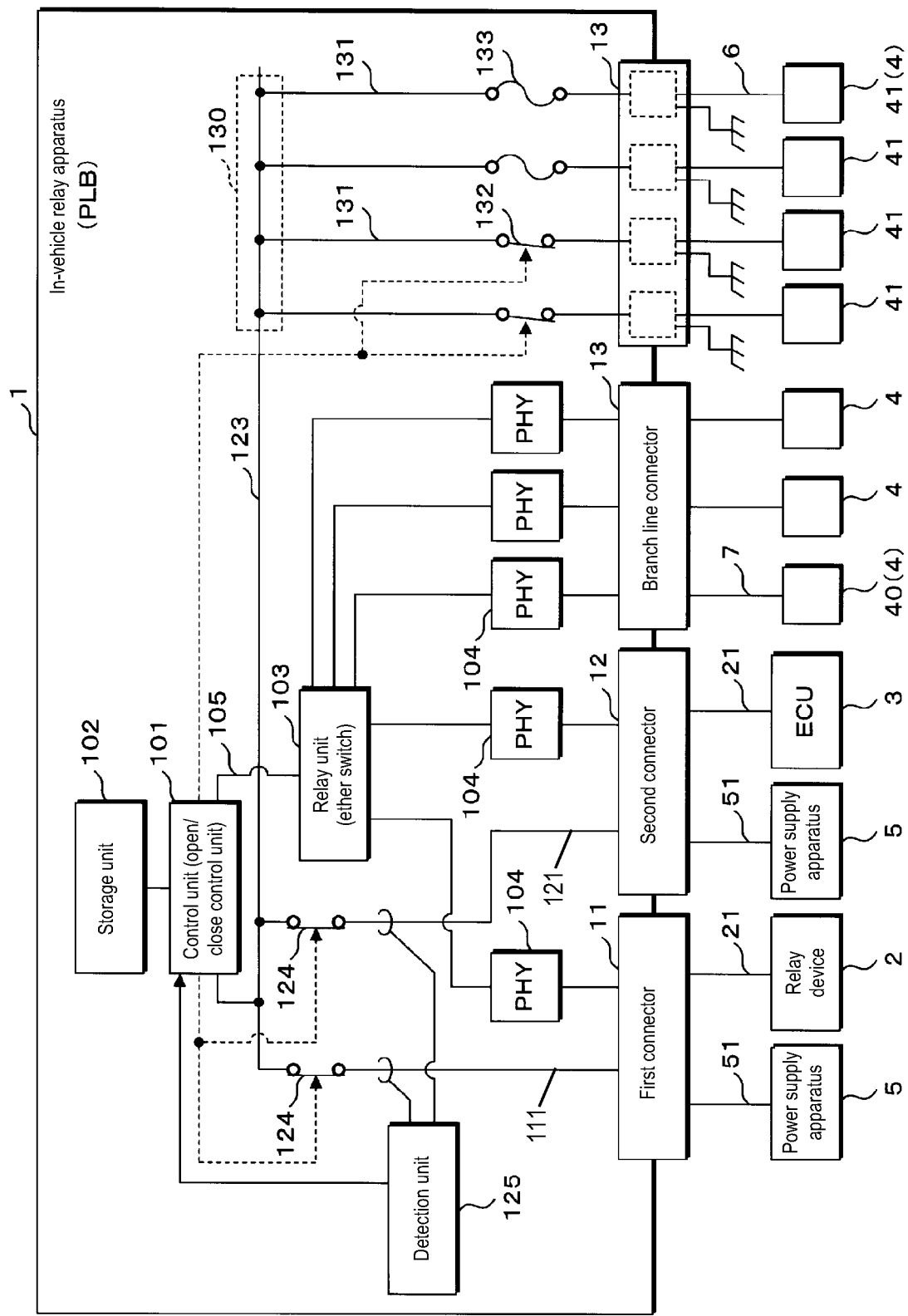
FIG. 4 is a block diagram showing a configuration of an in-vehicle relay apparatus according to Embodiment 2 (relay element).

FIG. 4 is a block diagram showing a configuration of an in-vehicle relay apparatus 1 according to Embodiment 2 (relay element 124). The in-vehicle relay apparatus 1 according to Embodiment 2 differs from that in Embodiment 1 in that each of the first wire 111 and the second wire 121 is provided with a relay element 124.

The in-vehicle relay apparatus 1 of Embodiment 2 includes the relay elements 124 respectively provided on the first wire 111 and the second wire 121, and a detection unit 125 that detects the voltage value of the voltage of the first wire 111 between the corresponding relay element 124 and the first connector 11 and the voltage value of the voltage of the second wire 121 between the corresponding relay element 124 and the second connector 12.

The relay elements 124 respectively provided on the first wire 111 and the second wire 121 may be mechanical relays or semi-conductor relays that use a FET or the like. The relay elements 124 are each connected to the control unit 101 by a signal line, and are opened (turned off) and closed (turned on) based on signals output from the control unit 101. That is, the control unit 101 functions as an open/close control unit by executing a control program.

The detection unit 125 is constituted by, for example, a hall element, a shunt resistor, or the like, and detects the voltage value of the voltage of the first wire 111 between the corresponding relay element 124 and the first connector 11 and the voltage of the second wire 121 between the corresponding relay element 124 and the second connector 12. The detection unit 125 outputs the detected voltage values to the control unit 101, and the control unit 101 (open/close control unit) suppresses reverse flow of a current or an abnormal voltage that is lower than a predetermined threshold by opening (turning off) or closing (turning on) the relay elements 124 based on the detected voltage values.

In the present embodiment, the relay elements 124 are provided in place of the rectifying elements 122, which are diodes or the like, but there is no limitation to this. Similarly to Embodiment 1, the rectifying elements 122, which are diodes or the like, may be provided on the first wire 111 and the second wire 121, and the relay elements 124 may also be provided respectively connected in series to the rectifying elements 122. That is, a relay element 124 may be provided on the anode side of each diode (rectifying element 122). As a result of forming a series circuit using the relay elements 124 and the diodes (rectifying elements 122), the occurrence of a current flowing in reverse can be even more efficiently prevented.

Figure 5:
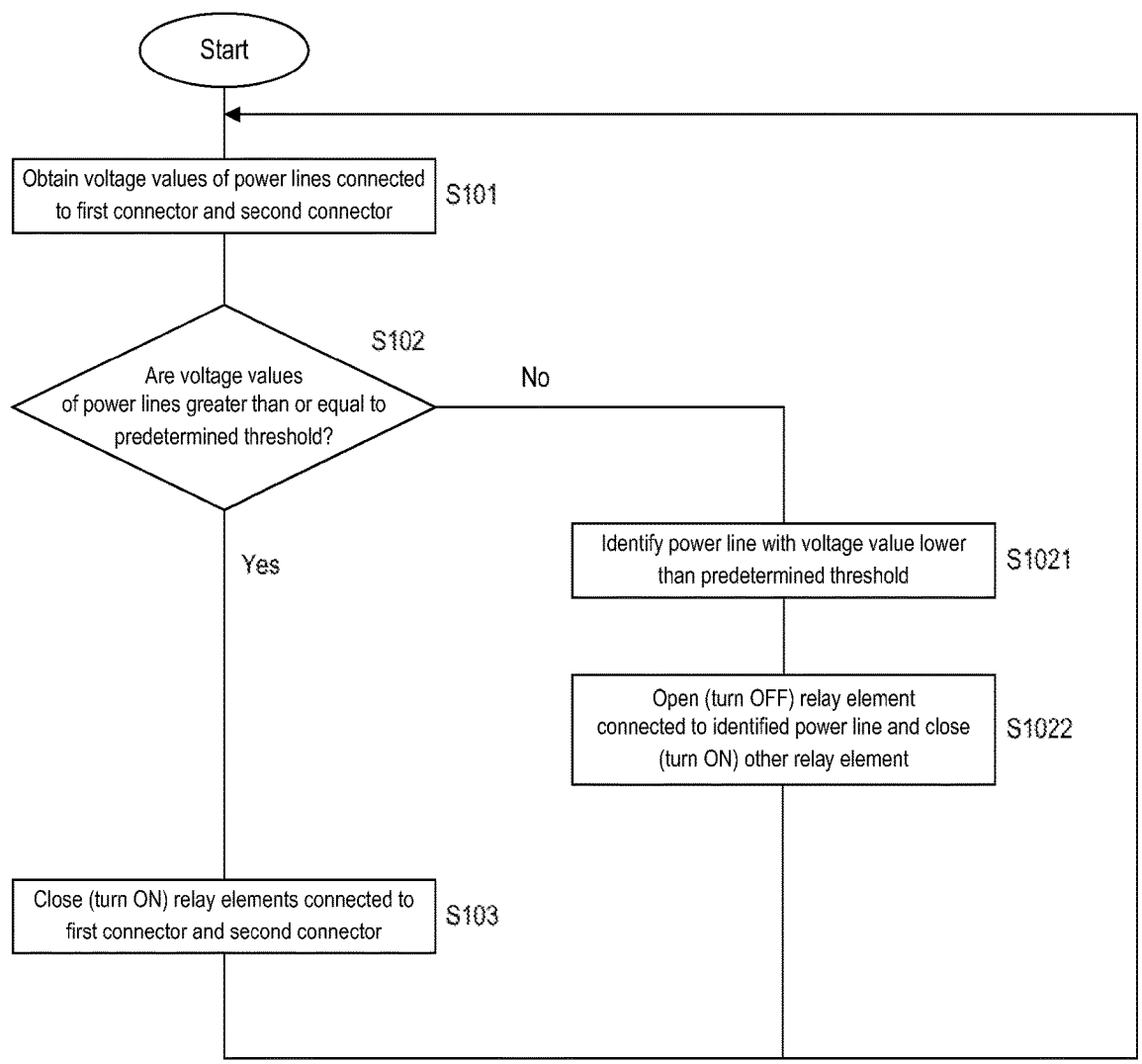
FIG. 5 is a flow chart illustrating an example of processing performed by a control unit (open/close control unit) of the in-vehicle relay apparatus.

FIG. 5 is a flow chart showing an example of processing performed by the control unit 101 (open/close control unit) of the in-vehicle relay apparatus 1. The control unit 101 (open/close control unit) of the in-vehicle relay apparatus 1 constantly performs the following processing in a start-up state (ignition switch is on) or a stopped state (ignition switch is off).

The control unit 101 of the in-vehicle relay apparatus 1 obtains the voltage values of the power lines 51 respectively connected to the first connector 11 and the second connector 12 (step S101). Different power supply apparatuses 5 are respectively connected to the power lines 51 connected to the first connector 11 and the second connector 12. The control unit 101 obtains the voltage values of the voltages output from (applied by) the different power supply apparatuses 5 via the power lines 51 connected to the first connector 11 and the second connector 12.

The control unit 101 of the in-vehicle relay apparatus 1 determines whether or not the voltage values of the power lines 51 are greater than or equal to a predetermined threshold (step S102). The predetermined threshold is, for example, 12 V which has been determined in advance as a rated output voltage. The control unit 101 obtains, from the detection unit 125, the voltage value of the voltage of the first wire 111 connected to the first connector 11 and the voltage value of the voltage of the second wire 121 connected to the second connector 12, and compares the thus obtained voltage values with the predetermined threshold (rated output voltage value) stored in advance in the storage unit 102 to determine whether or not the voltage values are greater than or equal to the predetermined threshold.

If the voltage values of both of the power lines 51 are greater than or equal to the predetermined threshold (step S102: Yes), the control unit 101 of the in-vehicle relay apparatus 1 closes (turns on) the relay elements 124 respectively connected to the first connector 11 and the second connector 12 (step S103). If the voltage values of both power lines 51 are greater than or equal to the predetermined threshold, the voltages output from (applied by) the power storage apparatuses respectively connected to the power lines 51 are normal voltages, and thus the control unit 101 closes (turns on) the relay elements 124 respectively connected to the first connector 11 and the second connector 12. The power supplied from the power storage apparatuses is supplied to the in-vehicle devices 4 (the in-vehicle devices 4 provided on the roof R) respectively connected to the branching wires 131 via the single wire system 123 and the branching wires 131.

If the voltage value of one of the power lines 51 is lower than the predetermined threshold (step S102: No), the control unit 101 of the in-vehicle relay apparatus 1 identifies the power line 51 whose voltage value is lower than the predetermined threshold (step S1021). If the voltage value of one of the power lines 51 is below the predetermined threshold, the control unit 101 identifies the power line 51 whose voltage value is lower than the predetermined threshold, that is, the control unit 101 identifies the wire (first wire 111 or second wire 121) connected to the connector (first connector 11 or second connector 12) to which the abnormal power supply apparatus 5 is connected.

The control unit 101 of the in-vehicle relay apparatus 1 opens (turns off) the relay element 124 connected to the thus identified power line 51, and closes (turns on) the relay element 124 connected to the other connector (step S1022). For example, if the voltage of the power line 51 connected to the second connector 12 is abnormal, the control unit 101 opens (turns off) the identified power line 51, that is, turns off the relay element 124 connected to the second wire 121 connected via the identified power line 51 and the second connector 12. The power line 51 that is not identified is, in other words, the power line 51 to which a normal voltage that is greater than or equal to the predetermined threshold is applied, and the control unit 101 closes (turns on) the relay element 124 connected to the first wire 111 connected via the non-identified power line 51 and the first connector 11.

With the present embodiment, the relay element 124 on the side where the voltage below the predetermined threshold (abnormal voltage) is applied to the power line 51 is opened (turned off), and the relay element 124 on the side where the voltage greater than or equal to the predetermined threshold (normal voltage) is applied to the power line 51 is closed (turned on), and thus a current can be prevented from flowing in reverse. Furthermore, the in-vehicle devices 4 provided on the roof R can be efficiently protected from abnormal voltages.

Figure 6:
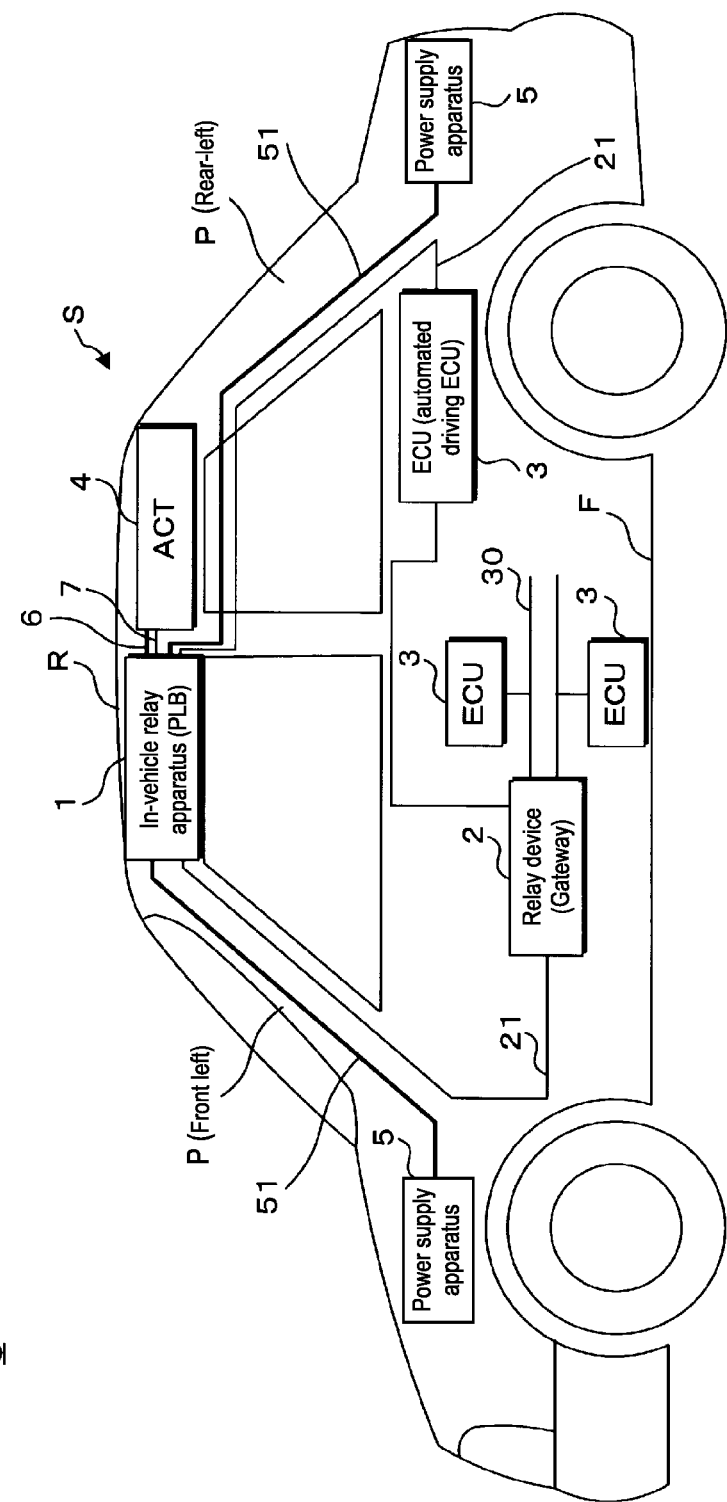
FIG. 6 is a schematic plan view of a configuration of a vehicle in which an in-vehicle relay apparatus according to Embodiment 3 is installed (front and back pillars).

FIG. 6 is a schematic plan view of a configuration of the vehicle C in which the in-vehicle relay apparatus 1 according to Embodiment 3 (front-back pillar) is installed. The in-vehicle relay apparatus 1 of Embodiment 3 is connected to the relay device 2 (central G/W), the in-vehicle ECU 3 (automated driving ECU), and two power supply apparatuses 5 that are not provided on the roof R, by the power lines 51 and the communication lines 21 respectively provided on front and rear pillars P of the vehicle C.

Wire harnesses formed by the power lines 51 and the communication lines 21 are routed along the front and rear pillars P between the roof R, the floor, and the like. As illustrated in FIG. 6, the in-vehicle relay apparatus 1 is connected to the power supply apparatus 5 located on the front side of the vehicle C by the power line 51 routed along the front-left pillar P, and is connected to the relay device 2 located at a middle portion of the vehicle C by the communication line 21 routed along the front-left pillar P. Furthermore, the in-vehicle relay apparatus 1 is connected to the power supply apparatus 5 located on the rear side of the vehicle C by the power line 51 routed along the rear-left pillar P, and is connected to the in-vehicle ECU 3 (automated driving ECU) located on the rear side of the vehicle C by the communication line 21 routed along the rear-left pillar P.

The in-vehicle relay apparatus 1 is supplied with power output from the power supply apparatuses 5 via two systems realized by power lines 51 respectively routed from different power supply apparatuses 5 and routed on different pillars P. The in-vehicle relay apparatus 1 is directly connected to the relay device 2 and the in-vehicle ECU 3 (automated driving ECU) by the communication lines 21 respectively routed along different pillars P. Similarly to Embodiment 1, the in-vehicle relay apparatus 1 and the relay device 2 and the in-vehicle ECU 3 (automated driving ECU) communicably connected to each other by the communication lines 21 respectively routed along different pillars P form an in-vehicle LAN 30 that has a loop-shaped network topology.

With the present embodiment, the power lines 51 and the communication lines 21 are correspondingly routed along different pillars P located on the front and rear side of the vehicle C. Accordingly, even if the vehicle C is subjected to a collision from the front or rear thereof, the relaying of power and data can be continued to the in-vehicle devices 4 provided on the roof R via the power line 51 and the communication line 21 provided on the pillar P on the side not subjected to the collision.

Figure 7:
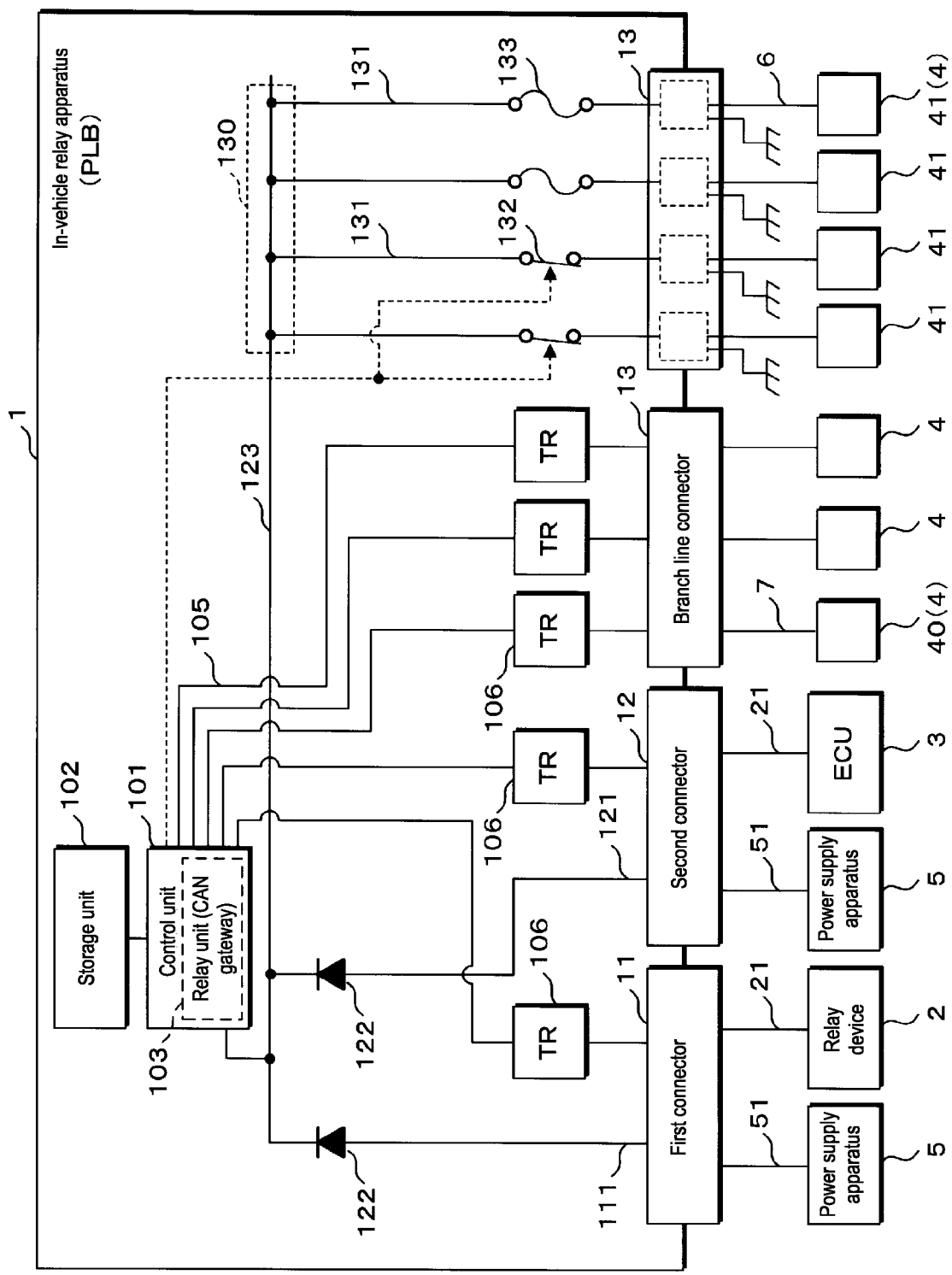
FIG. 7 is a block diagram showing a configuration of an in-vehicle relay apparatus according to Embodiment 4 (CAN gateway).

FIG. 7 is a block diagram showing a configuration of the in-vehicle relay apparatus 1 according to Embodiment 4 (CAN gateway). The in-vehicle relay apparatus 1 of Embodiment 4 includes a communication system that conforms to CAN and a CAN transceiver 106 serving as a communication unit, for example.

The control unit 101 of the in-vehicle relay apparatus 1 is constituted by a relay unit 103 that functions as a CAN gateway. The control unit 101 (relay unit 103) that functions as a CAN gateway and the CAN transceiver 106 are each communicably connected to the internal bus 105.

The CAN transceiver 106 includes a CAN transceiver 106 on the first connector 11 side and one on the second connector 12 side, and a CAN transceiver 106 on the branch line connector 13 side. The CAN transceivers 106 are physical layer I/Fs (interfaces) that are determined based on CAN communication protocol.

The CAN transceiver 106 on the first connector 11 side and on the second connector 12 side are respectively connected to the communication line 21 connected to the first connector 11 and the second connector 12, that is, it is connected to the communication line 21 connected to the relay device 2 or the in-vehicle ECU 3 (automated driving ECU) not provided on the roof R. The CAN transceiver 106 on the branch line connector 13 side is connected to the in-roof communication line 7 (CAN bus) connected to the branch line connector 13, that is, it is connected to the in-roof communication line 7 (CAN bus) connected to the in-vehicle device 4 that is the external communication apparatus 40 or the like provided on the roof R.

The control unit 101 (relay unit 103) functioning as a CAN gateway also includes a CAN controller function and performs relay control such as arbitration processing and relay processing based on CAN-IDs and the like included in CAN messages. The relay unit 103 detects whether or not a communication line 21 is broken by, for example, obtaining a differential voltage of the communication lines 21 (CAN busses) respectively connected via the CAN transistors 106. Further communication redundancy can be realized by the relay unit 103 disabling the CAN transceiver 106 connected to the communication line 21 that cannot perform communication due to disconnection or the like thereof, and only using the other CAN transceiver 106, that is, the CAN transceiver 106 connected to the normal communication line 21 (CAN bus).

In the present embodiment, the communication units of the in-vehicle relay apparatus 1 were described as being the CAN transceivers 106 instead of the Ethernet PHY units 104, but there is no limitation to this. The in-vehicle relay apparatus 1 may include both the Ethernet PHY units 104 and the CAN transceivers 106 as communication units. For example, a configuration may be employed in which the in-vehicle relay apparatus 1 performs TCP/IP communication with the relay device 2 (central G/W) and the in-vehicle ECU 3 (automated driving ECU), which are in-vehicle devices not provided on the roof R, via the Ethernet PHY units 104, and performs CAN communication with an in-vehicle devices 4 such as the in-vehicle load 41 provided on the roof R via the CAN transceivers 106. In this case, the control unit 101 may convert protocols between IP packets according to TCP/IP and CAN messages according to CAN.

With the present embodiment, the control unit 101 includes the relay unit 103 (CAN gateway), and thus the in-vehicle relay apparatus 1 functions as a CAN controller and a CAN gateway for CAN messages that pass through the communication lines 21. Accordingly, further redundancy in the relaying of CAN messages between the in-vehicle devices 4 provided on the roof R and the in-vehicle devices 4 not provided on the roof R can be realized.

The embodiments disclosed herein are exemplary in all respects, and should be construed as not being restrictive. The scope of the present invention is indicated by the claims rather than the above description, and all changes that come within the meaning and range of equivalency of the claims are intended to be embraced therein.

The invention claimed is:

1. An in-vehicle relay apparatus to be provided on a roof of a vehicle, comprising:
    a first connector to which a power line and a communication line provided on one pillar of the vehicle are to be connected;
    a second connector to which a power line and a communication line provided on a different pillar from the one pillar are to be connected;
    a branch line connector to which power lines and communication lines extending from a plurality of in-vehicle devices provided on the roof are to be connected;
    a branching portion that branches a single wire system into power lines that are connected to the branch line connector, the single wire system being a system in which the power lines respectively connected to the first connector and the second connector are integrated into one system; and
    a relay unit configured to relay data passing between the communication lines respectively connected to the first connector and the second connector and the communication lines connected to the branch line connector,
    wherein two power supply apparatuses are installed in the vehicle, the power supply apparatus to which a voltage is applied via the power line connected to the first connector and the power supply apparatus to which a voltage is applied via the power line connected to the second connector being different from each other, and
    the in-vehicle relay apparatus is to be connected to a relay device installed in the vehicle, via the communication line connected to the first connector and via the communication line and an in-vehicle apparatus connected to the second connector.

2. The in-vehicle relay apparatus according to claim 1, wherein rectifying elements are respectively provided interposed between the first and second connectors and the single wire system, with a direction from the first connector and the second connector toward the single wire system being a forward direction.

3. The in-vehicle relay apparatus according to claim 1, wherein relay elements are respectively provided interposed between the first and second connectors and the single wire system.

4. The in-vehicle relay apparatus according to claim 3, comprising:
    a detection unit configured to detect a voltage applied via the power lines connected to the first connector and the second connector; and
    an open/close control unit configured to control opening and closing of the relay elements based on a detection value output from the detection unit.

5. The in-vehicle relay apparatus according to claim 4, wherein the detection value includes information regarding a voltage value of each of the voltage applied via the power line connected to the first connector and the voltage applied via the power line connected to the second connector,
    if one of the voltage values is lower than a predetermined threshold, the open/close control unit performs control to open the relay element connected to the power line to which the voltage of the one of the voltage values is applied, and
    if one of the voltage values is greater than or equal to the predetermined threshold, the open/close control unit performs control to close the relay element connected to the power line to which the voltage of the one of the voltage values is applied.

6. The in-vehicle relay apparatus according to claim 1, wherein the one pillar and the different pillar are respectively located on left and right sides of the vehicle.

7. The in-vehicle relay apparatus according to claim 1, wherein the one pillar and the different pillar are respectively located on front and rear sides of the vehicle.

8. The in-vehicle relay apparatus according to claim 1, wherein the relay unit includes an Ether switch, and
    an Ethernet PHY unit is interposed between the first and second connectors and the Ether switch.

9. The in-vehicle relay apparatus according to claim 1, wherein the relay unit includes a CAN gateway, and
    a CAN transceiver is interposed between the first and second connectors and the CAN gateway.

* * * * *